US011299050B2

(12) United States Patent
Hirukawa et al.

(10) Patent No.: US 11,299,050 B2
(45) Date of Patent: Apr. 12, 2022

(54) ELECTRIC VEHICLE

(71) Applicant: HONDA MOTOR CO., LTD., Tokyo (JP)

(72) Inventors: Masayuki Hirukawa, Wako (JP); Masaru Nakayama, Wako (JP); Kuniaki Ikui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 16/634,892

(22) PCT Filed: Jul. 26, 2018

(86) PCT No.: PCT/JP2018/028063
§ 371 (c)(1),
(2) Date: Jan. 29, 2020

(87) PCT Pub. No.: WO2019/044295
PCT Pub. Date: Mar. 7, 2019

(65) Prior Publication Data
US 2020/0231050 A1    Jul. 23, 2020

(30) Foreign Application Priority Data

Aug. 31, 2017  (JP) .............................. JP2017-167819

(51) Int. Cl.
*B60K 1/04* (2019.01)
*B60L 50/60* (2019.01)
*B60L 58/22* (2019.01)

(52) U.S. Cl.
CPC .............. *B60L 50/66* (2019.02); *B60K 1/04* (2013.01); *B60L 58/22* (2019.02)

(58) Field of Classification Search
CPC ............ B60L 50/66; B60L 58/22; B60K 1/04
See application file for complete search history.

(56) References Cited

U.S. PATENT DOCUMENTS

| 2011/0221384 A1* | 9/2011 | Scheucher | .............. B60L 50/66 |
| | | | 320/101 |
| 2013/0313030 A1* | 11/2013 | Matsumura | ............. E02F 9/207 |
| | | | 180/65.1 |

FOREIGN PATENT DOCUMENTS

| CN | 205039368 | 2/2016 |
| EP | 0539269 | 4/1993 |
| EP | 2500962 | 5/2016 |
| EP | 2996893 | 8/2017 |
| JP | 05-112270 | 5/1993 |

(Continued)

OTHER PUBLICATIONS

Indian Office Action for Indian Patent Application No. 202047007063 dated Sep. 21, 2020.

(Continued)

*Primary Examiner* — Jonathan Ng
*Assistant Examiner* — James J Triggs
(74) *Attorney, Agent, or Firm* — Amin, Turocy & Watson, LLP

(57) ABSTRACT

An electric vehicle includes: a pair of left and right batteries (26a); a pair of left and right battery-holding portions (28d) which respectively hold the left and right batteries (26a); and a pair of left and right battery connection terminals (28c1) which are provided on inner sides of the left and right battery-holding portions (28d) in a vehicle width direction and connected respectively to the left and right batteries (26a).

1 Claim, 8 Drawing Sheets

(56) References Cited

FOREIGN PATENT DOCUMENTS

| | | |
|---|---|---|
| JP | 09-322414 | 12/1997 |
| JP | 2012-151916 | 8/2012 |
| JP | 2014-094617 | 5/2014 |
| JP | 2017-137002 | 8/2017 |
| WO | 2012/124568 | 9/2012 |
| WO | 2014/060074 | 4/2014 |

OTHER PUBLICATIONS

International Search Report and Written Opinion for International Application Serial No. PCT/JP2018/028063 dated Oct. 30, 2018, 8 pages.
Taiwanese Office Action for Taiwanese Patent Application No. 107126835 dated Apr. 8, 2019.

\* cited by examiner

ELECTRIC VEHICLE

TECHNICAL FIELD

The present invention relates to an electric vehicle.

Priority is claimed on Japanese Patent Application No. 2017-167819, filed on Aug. 31, 2017, the contents of which are incorporated herein by reference.

BACKGROUND

Conventionally, an electric vehicle is known in which a plurality of batteries are mounted (for example, see Patent Document 1). In this technology, a center console disposed between a pair of left and right rear seats 24L and 24R is disposed to extend rearward from a driver's seat 23 in a lateral center of a vehicle body, some of the batteries 51A to 51C of the plurality of batteries 51A to 51F are disposed below the driver's seat 23, and the other batteries 51D to 51F of the plurality of batteries 51A to 51F are disposed behind the driver's seat 23 and disposed below the center console and below the pair of left and right rear seats 24L and 24R.

RELATED ART DOCUMENTS

Patent Documents

Patent Document 1

Japanese Unexamined Patent Application, First Publication No. 2014-94617

SUMMARY OF INVENTION

Problems to be Solved by the Invention

In the above-described conventional technology, a connection terminal for each battery is provided at one end portion of each of the plurality of batteries in a longitudinal direction thereof at the lateral center of the vehicle body with the longitudinal direction disposed in a lateral direction of the vehicle body.

However, considering that external disturbances from outside in a vehicle width direction may affect the connection terminal of the battery, further improvement is required.

Aspects of the present invention provide an electric vehicle in which it is difficult for external disturbances from outside in the vehicle width direction to affect a connection terminal of a battery.

Means for Solving the Problem (1) An electric vehicle according to one aspect of the present invention includes: a pair of left and right batteries; a pair of left and right battery-holding portions which respectively hold the left and right batteries; and a pair of left and right battery connection terminals which are provided on inner sides of the left and right battery-holding portions in a vehicle width direction and connected respectively to the left and right batteries.

(2) The electric vehicle may include a pair of left and right battery wirings which correspond respectively to the left and right batteries between the left and right battery-holding portions, the right battery wiring may be connected to the right battery connection terminal from a side inward in the vehicle width direction from the right battery-holding portion, and the left battery wiring may be connected to the left battery connection terminal from a side inward in the vehicle width direction from the left battery-holding portion.

(3) The electric vehicle may include a distribution box which distributes the battery wirings toward the left and right battery connection terminals, and the distribution box may be disposed between the left and right battery-holding portions.

(4) The electric vehicle may include: an electric motor connected to a drive wheel; and a control unit which controls charging and discharging between the electric motor and the left and right batteries, the control unit may be disposed behind the distribution box, and a second wiring extending between the distribution box and the control unit, a third wiring extending between the control unit and the electric motor, and the left and right battery wirings may be disposed in a region surrounded by the left and right battery-holding portions, the distribution box, and the control unit.

Advantage of the Invention

According to the above configuration (1), since the battery connection terminals connecting the left and right batteries are disposed to be directed inward in the vehicle width direction of the left and right battery-holding portions, it is difficult for external disturbances from outside in the vehicle width direction to affect the battery connection terminals, and thus the battery connection terminals can be satisfactorily protected.

According to the above configuration (2), since the battery wirings extending to the battery connection terminals are disposed on sides inward in the vehicle width direction from the left and right battery-holding portions, high-voltage wirings can be satisfactorily protected.

According to the above configuration (3), since the distribution box is disposed between the left and right battery-holding portions, it is possible to achieve wiring optimization such as shortening the battery wirings extending from the distribution box to the left and right battery connection terminals.

According to the above configuration (4), since the high-voltage electrical wirings are disposed in a space surrounded by the left and right battery-holding portions, the distribution box and the control unit, electrical wirings are concentrated inside in the vehicle width direction so that it is difficult for external disturbances to affect the electrical wirings, and thus the high-voltage wirings can be satisfactorily protected.

DESCRIPTION OF THE EMBODIMENTS

Figure 1:
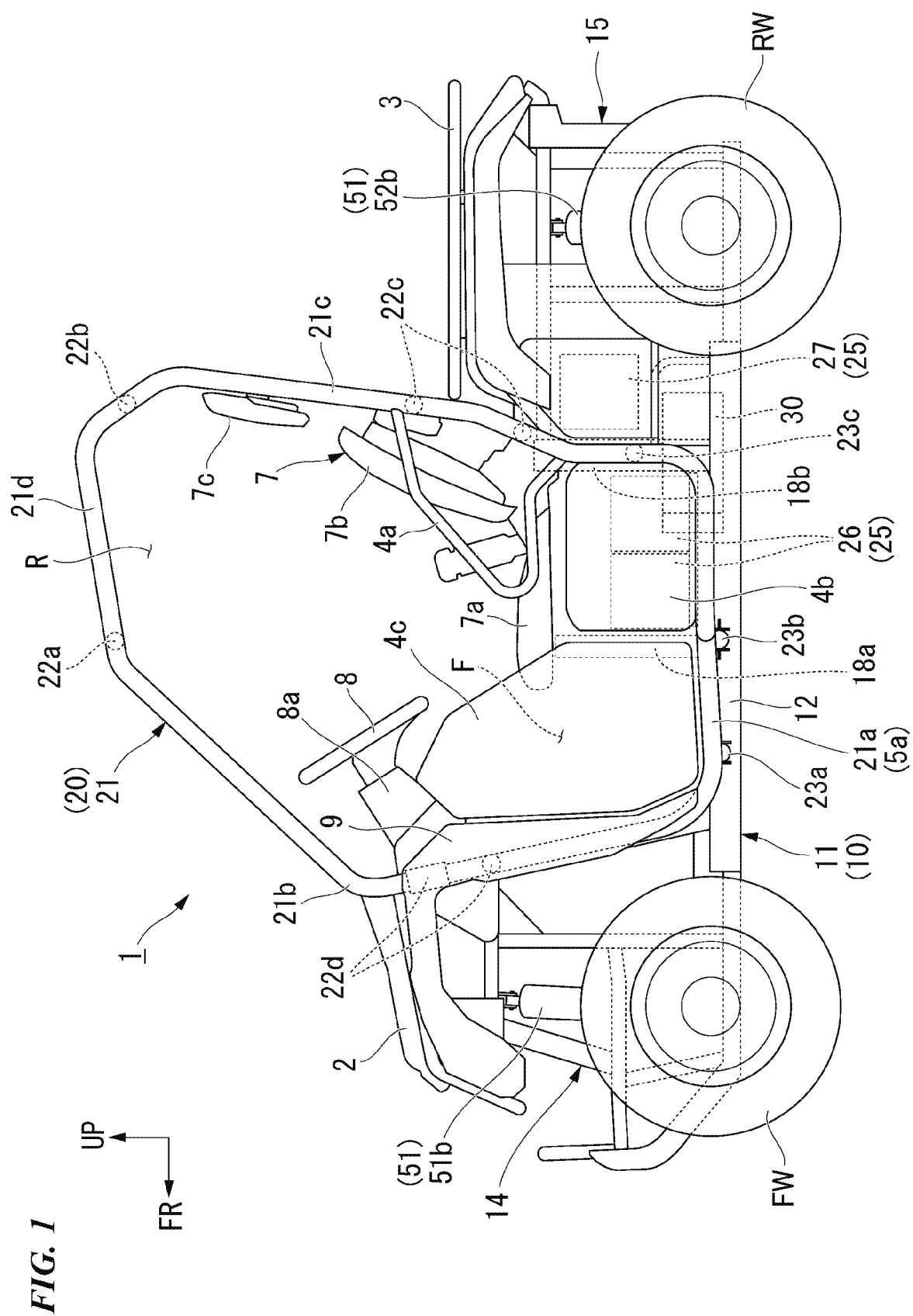
FIG. 1 is a left side view of an electric vehicle according to an embodiment of the present invention.

Hereinafter, embodiments of the present invention will be described with reference to the drawings. Also, directions such as forward, rearward, leftward and rightward in the following description are the same as those in the vehicle described below unless otherwise specified. In addition, at appropriate places in the drawings used for the following description, an arrow FR indicating forward in the vehicle, an arrow LH indicating leftward in the vehicle, an arrow UP indicating upward in the vehicle, and a line CL indicating a lateral center of a vehicle body are shown.

<Overall Vehicle>

Figure 2:
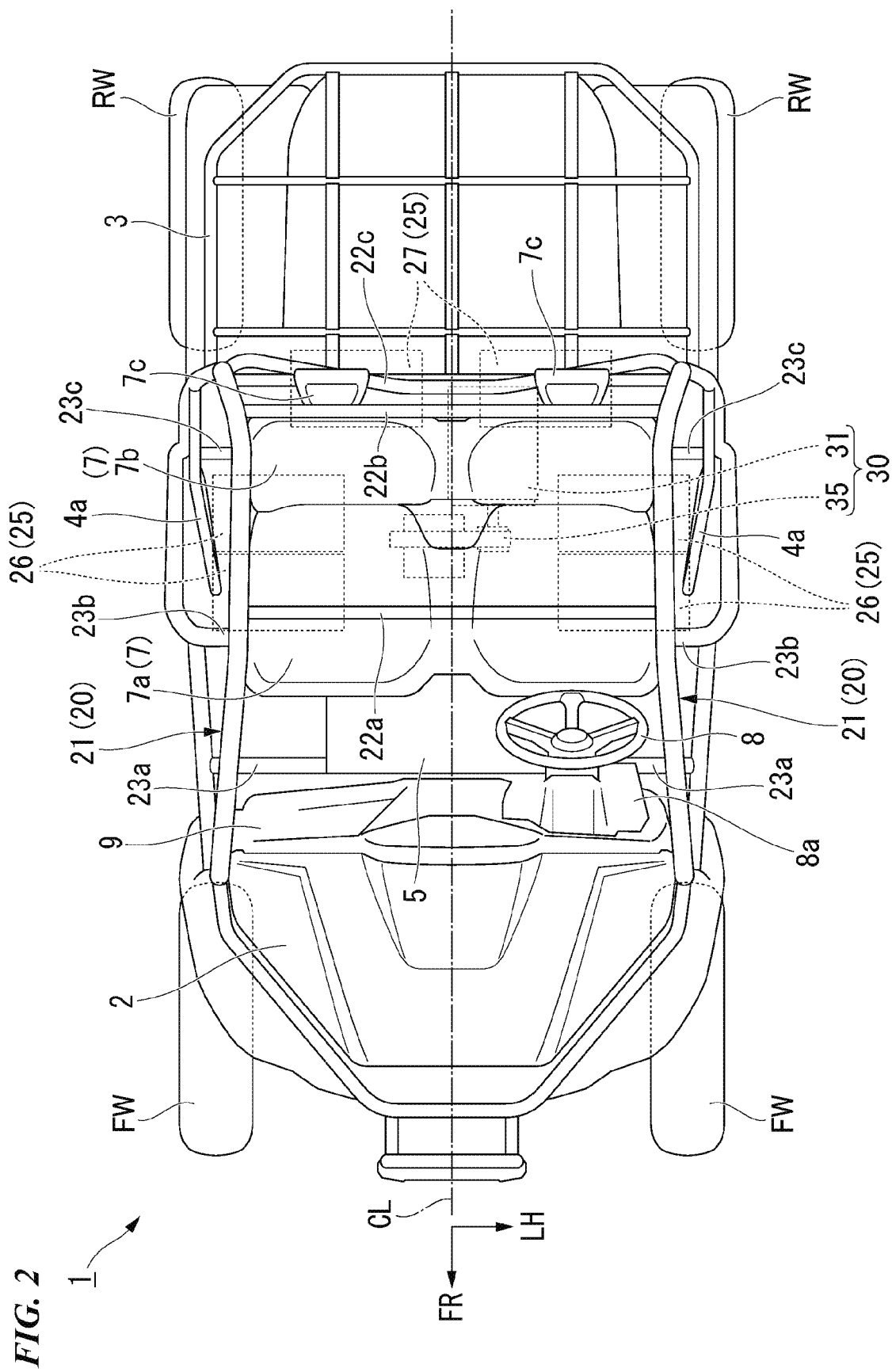
FIG. 2 is a top view of the electric vehicle.

An electric vehicle 1 shown in FIGS. 1 and 2 includes a pair of left and right front wheels FW as steerable wheels and drive wheels on both left and right sides of a front section of a vehicle body, and includes a pair of left and right rear wheels RW as drive wheels on left and right sides of a rear section of the vehicle body. For example, the electric vehicle 1 of the present embodiment is a relatively small four-wheeled vehicle (a multi-utility vehicle (MUV)) whose main purpose is to travel on irregular ground such as wasteland. Also, the electric vehicle 1 is not limited to an MUV.

The electric vehicle 1 includes a roll bar 20 as an upper body that defines a riding space R. A seat 7 having a seat body 7a and a backrest 7b is disposed in the riding space R. The seat 7 includes a pair of left and right seating surfaces. A dashboard 9 is disposed in front of the seat 7 with a foot space F therebetween. A steering wheel 8 is disposed on one side of left and right sides of the dashboard 9 (for example, the right side). A loading platform 3 is disposed behind the riding space R (back of the seat 7). A bonnet 2 is disposed in front of the riding space R. A pair of left and right guard pipes 4a are disposed on left and right sides of the seat 7. A pair of left and right side panels 4b are disposed below the left and right guard pipes 4a. Side doors 4c are disposed on left and right sides of the foot space F.

The roll bar 20 includes a pair of left and right loop-shaped portions 21, front and rear cross frames 13a and 13b which connect the left and right loop-shaped portions 21 to each other at a roof portion of the roll bar 20, a rear frame 16 which supports the backrest 7b of the seat 7 from behind at a rear portion of the roll bar 20 and supports left and right headrests 7c formed independently of each other, and a front frame 14 which supports the dashboard 9 and a steering column at a front portion of the roll bar 20.

The loop-shaped portion 21 continuously forms a lower side portion 21a which is disposed substantially horizontally in side view, a front upward extension portion 21b which bends from a front end portion of the lower side portion 21a and extends upward, a rear upward extension portion 21c which bends from a rear end portion of the lower side portion 21a and extends upward, and an upper side portion 21d which extends between an upper end portion of the front upward extension portion 21b and an upper end portion of the rear upward extension portion 21c. The lower side portion 21a is included in a step frame 5a. The lower side portion 21a supports a step floor 5 on which an occupant places his or her foot.

<Vehicle Body Frame>

Figure 3:
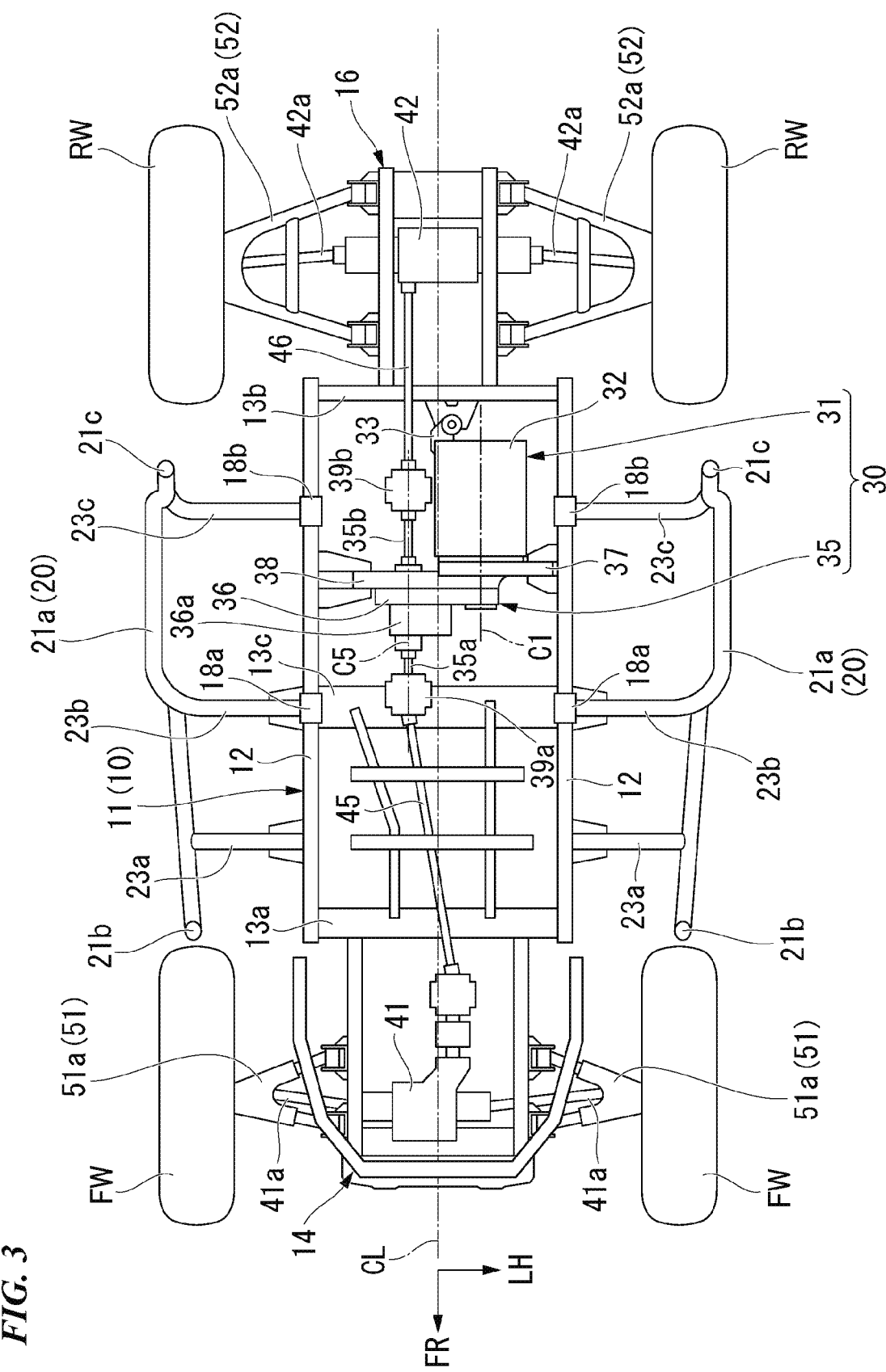
FIG. 3 is a top view showing a power transmission system from a drive source of the electric vehicle.

Referring to FIGS. 1 and 3, the roll bar 20 is mounted on a vehicle body frame 10 which is a lower body on which drive system components are mounted.

The vehicle body frame 10 is formed by integrally joining steel material pieces of a plurality of types by welding or the like. The vehicle body frame 10 includes a main frame 11 which has a frame shape in plan view including a pair of left and right side frames 12, the front frame 14 coupled to a front portion of the main frame 11, and the rear frame 16 coupled to a rear portion of the main frame 11.

A drive device 30 including an electric motor 31 that is a drive source of the electric vehicle 1 is mounted on the main frame 11. A front differential mechanism 41 is mounted on the front frame 14. A rear differential mechanism 42 is mounted on the rear frame 16. The front differential mechanism 41 is connected to the drive device 30 via a front propeller shaft 45 so that power can be transmitted thereto. The rear differential mechanism 42 is connected to the drive device 30 via a rear propeller shaft 46 so that power can be transmitted thereto. A front suspension device 51 that suspends the left and right front wheels FW is supported on the front frame 14. A rear suspension device 52 that suspends the left and right rear wheels RW is supported on the rear frame 16.

Front and rear seat-supporting frames 18a and 18b having heights are fixed to the main frame 11. The seat 7 is supported on the front and rear seat-supporting frames 18a and 18b via a substantially horizontal supporting frame 18c (see FIGS. 5 and 6). The seat 7 is disposed at substantially the center in a longitudinal direction of the vehicle and is spaced apart upward from the main frame 11. A battery 25 that supplies power to the electric motor 31 of the drive device 30 is mounted in a space ranging from a side below the seat 7 to a side behind and below the seat 7. The battery 25 is configured of a plurality of unit batteries 25a.

A junction box 61 (distribution box) that collects unit wirings 61a (a pair of left and right battery wirings) extending from the plurality of unit batteries 25a is disposed below the seat 7. A power driver unit (PDU) 62 to which collective wirings 61b (a second wiring) extending from the junction box 61 are connected is disposed behind the junction box 61. An electric control unit (ECU) 66 that drives and controls the electric motor 31 via the PDU 62 is disposed above the PDU 62. For example, the PDU 62 and the ECU 66 constitute an integrated control unit 66U (a control unit, see FIG. 8).

The main frame 11 includes the pair of left and right side frames 12 made of, for example, square steel pipes, a front cross frame 13a which connects front end portions of the left and right side frames 12, a rear cross frame 13b which connects rear end portions of the left and right side frames 12, and an intermediate cross frame 13c which connects front to rear intermediate portions of the left and right side frames 12 closer to front portions of left and right side frames 12 to each other. Also, the term "intermediate" used in the present embodiment indicates not only the center between both ends of an object but also includes an intermediary range between both ends of an object.

The lower side portion 21a of the right loop-shaped portion 21 of the roll bar 20 is connected to a right outer side of the right side frame 12 via front and rear connection frames 23a and 23b extending in a lateral direction of the vehicle. The lower side portion 21a of the left loop-shaped portion 21 of the roll bar 20 is connected to a left outer side of the left side frame 12 via front and rear connection frames 23a and 23b extending in the lateral direction. A lower portion of the rear upward extension portion 21c of the right loop-shaped portion 21 of the roll bar 20 is connected to a right outer side of the rear seat-supporting frame 18b via a rear upper connection frame 23c extending in the lateral direction. A lower portion of the rear upward extension portion 21c of the left loop-shaped portion 21 of the roll bar 20 is connected to a left outer side of the rear seat-supporting frame 18b via a rear upper connection frame 23c extending in the lateral direction.

Figure 5:
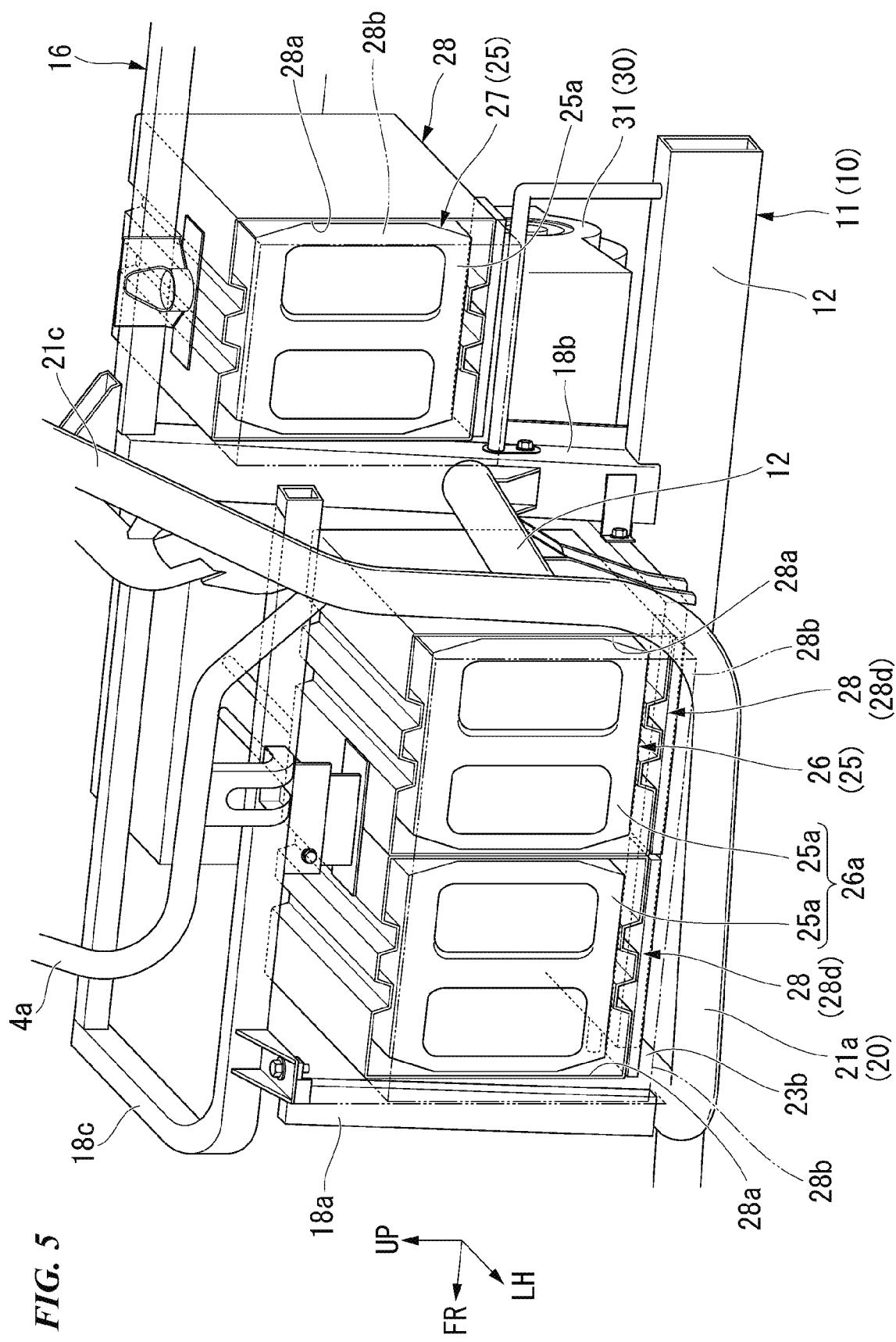
FIG. 5 is a perspective view showing surroundings of a battery and a battery case on a left side of a vehicle body of the electric vehicle.
Figure 6:
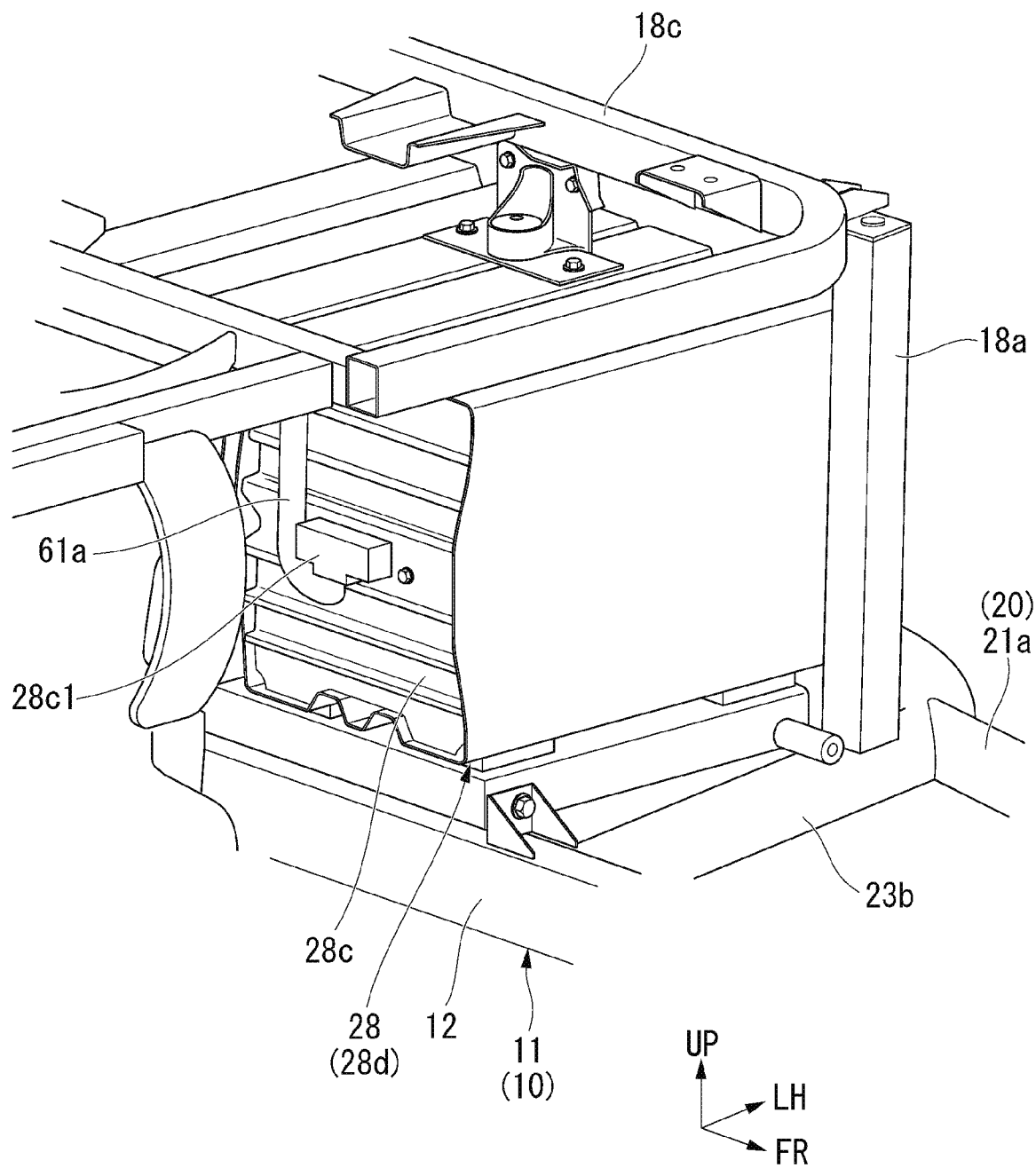
FIG. 6 is a perspective view showing an inner side of the battery case in a vehicle width direction.

Referring also to FIG. 5, the loop-shaped portions 21 have the lower side portions 21a which are outer arrangement portions disposed outward in a vehicle width direction from a unit battery pair 26a (a pair of left and right batteries) of the battery 25, which will be described later, and the rear upward extension portions 21c which are rear arrangement portions disposed behind the unit battery pair 26a. Further, the rear upper connection frames 23c are disposed behind the unit battery pair 26a. These frame members inhibit external disturbances from reaching the unit battery pair 26a.

Referring to FIGS. 1 and 3, the front frame 14 generally forms a box structure which has a lateral width narrower than that of the main frame 11 and a height higher than that of the main frame 11.

The front differential mechanism 41 is mounted inside the front frame 14. An inner end portion of a right suspension arm 51a of the front suspension device 51 is supported on a right side portion of the front frame 14 to be vertically swingable. An inner end portion of a left suspension arm 51a of the front suspension device 51 is supported on a left side portion of the front frame 14 to be vertically swingable. An upper end portion of a right cushion unit 51b of the front suspension device 51 is supported on an upper side of the right side portion of the front frame 14. An upper end portion of a left cushion unit 51b of the front suspension device 51 is supported on an upper side of the left side portion of the front frame 14.

A lower end portion of the right cushion unit 51b is connected to the right suspension arm 51a. A lower end portion of the left cushion unit 51b is connected to the left suspension arm 51a.

The rear frame 16 generally forms a box structure which has a lateral width narrower than that of the main frame 11 and a height higher than that of the main frame 11. The rear differential mechanism 42 is mounted inside the rear frame 16. An inner end portion of a right suspension arm 52a of the rear suspension device 52 is supported on a right side portion of the rear frame 16 to be vertically swingable. An inner end portion of a left suspension arm 52a of the rear suspension device 52 is supported on a left side portion of the rear frame 16 to be vertically swingable. An upper end portion of a right cushion units 52b of the rear suspension device 52 is supported on an upper side of the right side portion of the rear frame 16. An upper end portion of a left cushion unit 52b of the rear suspension device 52 is supported on an upper side of the left side portions of the rear frame 16. A lower end portion of the right cushion unit 52b is connected to the right suspension arm 52a. A lower end portion of the left cushion unit 52b is connected to the left suspension arm 52a.

<Drive Device>

Figure 7:
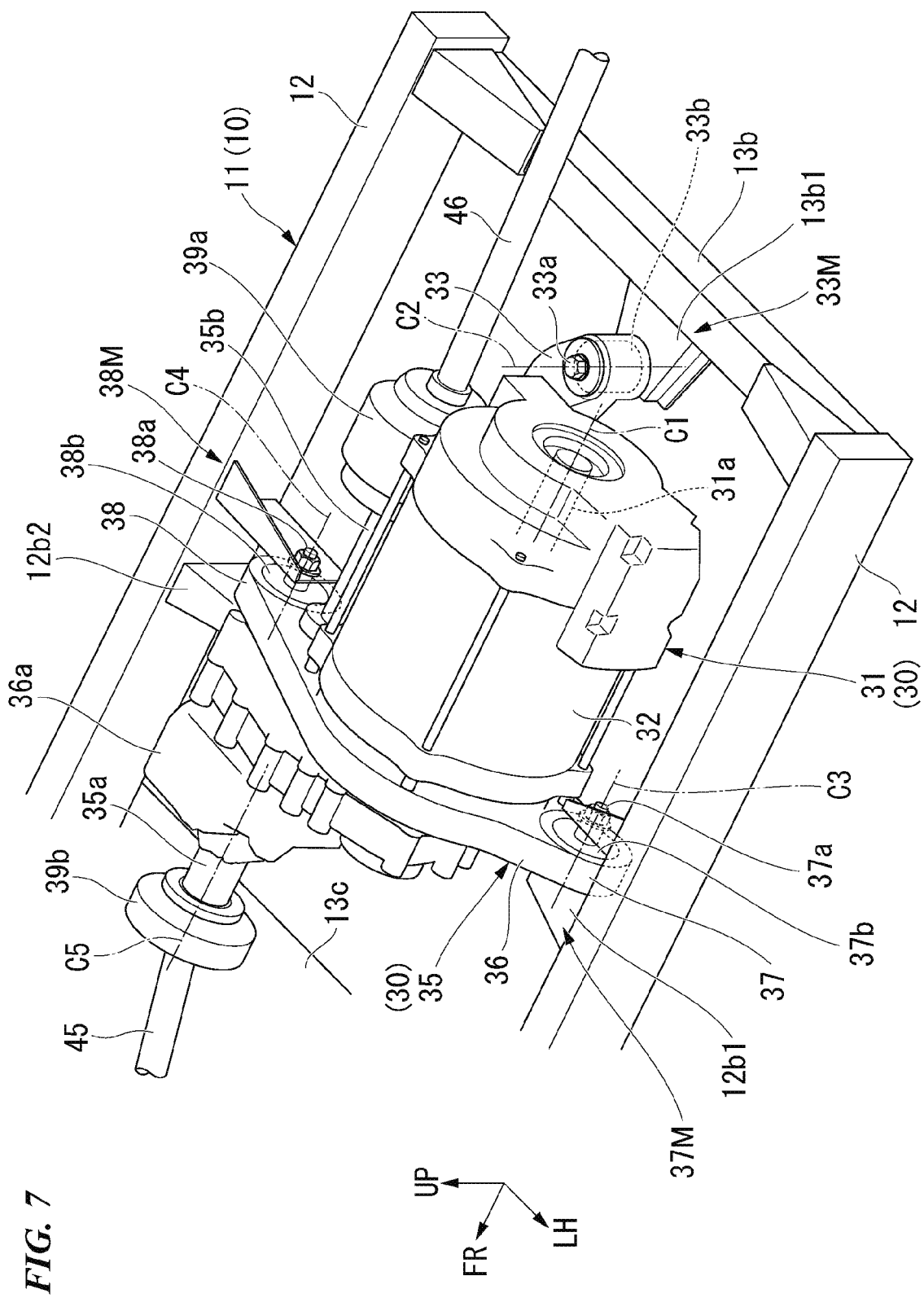
FIG. 7 is a perspective view showing surroundings of a drive device of the electric vehicle.

Referring to FIGS. 1, 3, and 7, the drive device 30 integrally has an electric motor 31 which is disposed on a left side of a rear portion of the main frame 11 with its drive axis (a motor axis) C1 directed in the longitudinal direction, and a distribution mechanism (a transfer) 35 which is provided to extend rightward from a front end portion of the electric motor 31 beyond a lateral center CL of the vehicle body.

The electric motor 31 is driven by the power of the battery 25. The electric motor 31 is driven at a variable speed on the basis of, for example, a variable voltage variable frequency (VVVF) control. The electric motor 31 has a continuously variable transmission to perform a shift control, but is not limited thereto, and may have a stepped transmission to perform the shift control.

The electric motor 31 includes a cylindrical housing 32 centered on the motor axis C1. A rear mount portion 33 for a motor-supporting portion 13b1 provided on the rear cross frame 13b of the main frame 11 is provided at the lateral center CL of the vehicle at a rear end portion of the housing 32. The rear mount portion 33 is supported (rubber-mounted) on the motor-supporting portion 13b1 via a bolt 33a extending in a vertical direction and a rubber bush 33b through which the bolt 33a is inserted. The reference sign C2 indicates an axis of the bolt 33a. A rubber mount portion 33M that supports a rear portion of the housing 32 of the electric motor 31 on the vehicle body frame 10 is configured by including the motor-supporting portion 13b1, the rear mount portion 33, the bolt 33a, and the rubber bush 33b.

The distribution mechanism 35 decelerates a driving force of the electric motor 31 and outputs the driving force to the front and rear propeller shafts 45 and 46. The distribution mechanism 35 includes a horizontally elongated casing 36 that accommodates a reduction gear or the like. A front end portion of the housing 32 of the electric motor 31 is integrally coupled to a left rear portion of the casing 36. A left mount portion 37 for a left supporting portion 12b1 provided on the left side frame 12 of the main frame 11 is provided at a left end portion of the casing 36. The left mount portion 37 is supported (rubber-mounted) on the left supporting portion 12b1 via a bolt 37a extending in the longitudinal direction and a rubber bush 37b through which the bolt 37a is inserted. The reference sign C3 indicates an axis of the bolt 37a. A rubber mount portion 37M that supports a left side portion of the casing 36 of the distribution mechanism 35 on the vehicle body frame 10 is configured by including the left supporting portion 12b1, the left mount portion 37, the bolt 37a, and the rubber bush 37b.

A right mount portion 38 for a right supporting portion 12b2 provided on the right side frame 12 is provided at a right end portion of the casing 36. The right mount portion 38 is supported (rubber-mounted) on the right supporting portion 12b2 via a bolt 38a extending in the longitudinal direction and a rubber bush 38b through which the bolt 38a is inserted. The reference sign C4 indicates an axis of the bolt 38a. A rubber mount portion 38M that supports a right side portion of the casing 36 of the distribution mechanism 35 on the vehicle body frame 10 is configured by including the right supporting portion 12b2, the right mount portion 38, the bolt 38a, and the rubber bush 38b.

The drive device 30 is mounted on an inner side of the main frame 11 via the rubber mount portion 33M, the rubber mount portion 37M, and the rubber mount portion 38M which are the mount portions on the three locations described above.

A front drive shaft 35a directed in the longitudinal direction extends forward from a right side portion of the distribution mechanism 35. A rear drive shaft 35b directed in the longitudinal direction extends rearward from the right side portion of the distribution mechanism 35. The front and rear drive shafts 35a and 35b are coaxial with each other. The reference sign C5 indicates an axis of the front and rear drive shafts 35a and 35b.

A front end portion of the front drive shaft 35a is supported by a front bearing portion 39a provided on the main frame 11. A rear end portion of the front propeller shaft 45 is connected to the front end portion via a universal joint. A front end portion of the front propeller shaft 45 is connected to the front differential mechanism 41 supported by the front frame 14 via a universal joint. A right drive shaft 41a extends from the front differential mechanism 41, and the right drive shaft 41a is connected to the right front wheel FW. A left drive shaft 41a extends from the front differential mechanism 41, and the left drive shaft 41a is connected to the left front wheel FW.

A rear end portion of the rear drive shaft 35b is supported by a rear bearing portion 39b provided on the main frame 11. A front end portion of the rear propeller shaft 46 is connected to the rear end portion via a universal joint. A rear end portion of the rear propeller shaft 46 is connected to the rear differential mechanism 42 supported by the rear frame 16 via a universal joint. A right drive shaft 42a extends from the rear differential mechanism 42, and the right drive shaft 42a is connected to the right rear wheel RW. A left drive shaft 42a extends from the rear differential mechanism 42, and the left drive shaft 42a is connected to the left rear wheel RW.

The front and rear drive shafts 35a and 35b (and thus the front and rear propeller shafts 45 and 46) of the distribution mechanism 35 and an output shaft 31a of the electric motor 31 are disposed separately on the left and right sides of the lateral center CL of the vehicle body.

The driving force of the electric motor 31 is transmitted to the left and right front wheels FW via the distribution mechanism 35, the front propeller shaft 45, the front differential mechanism 41, and the left and right drive shafts 41a, and is transmitted to the left and right rear wheels RW via the distribution mechanism 35, the rear propeller shaft 46, the rear differential mechanism 42, and the left and right drive shafts 42a. A clutch case 36a for accommodating a dog clutch that switches between whether or not power is transmitted to the front propeller shaft 45 is attached to a right front portion of the distribution mechanism 35.

Referring also to FIG. 2, at least a portion (a rear portion) of the electric motor 31 is disposed between the seat 7 and a second battery 27, which will be described later, of the battery 25 in plan view. At least a portion (a front portion in the present embodiment) of the electric motor 31 is disposed to overlap the seat 7 (that is, below the seat 7) in plan view. At least a portion of (all of in the present embodiment) the distribution mechanism 35 is disposed below the seat 7.

At least a portion (a lower portion in the present embodiment) of the electric motor 31 is disposed to overlap the side frame 12 of the vehicle body frame 10 in side view and to overlap the cross frames 13a, 13b, and 13c of the vehicle body frame 10 in front view.

The front and rear differential mechanisms 41 and 42 appropriately distribute the driving force transmitted to the left and right drive shafts and the left and right wheels using respective differential mechanisms accommodated in the housing.

The rear propeller shaft 46 extends in the longitudinal direction. The front propeller shaft 45 extends obliquely relative to the longitudinal direction to be positioned nearer to one side of the left and right sides (on the left side the same as that of the electric motor 31) toward its front side. By appropriately setting lateral positions of the end portions of the front and rear propeller shafts 45 and 46 on the differential mechanism sides, actions such as utilizing surroundings of a differential mechanism in an existing vehicle or sharing the front and rear differential mechanisms 41 and 42 can be performed.

<Battery>

Figure 4:
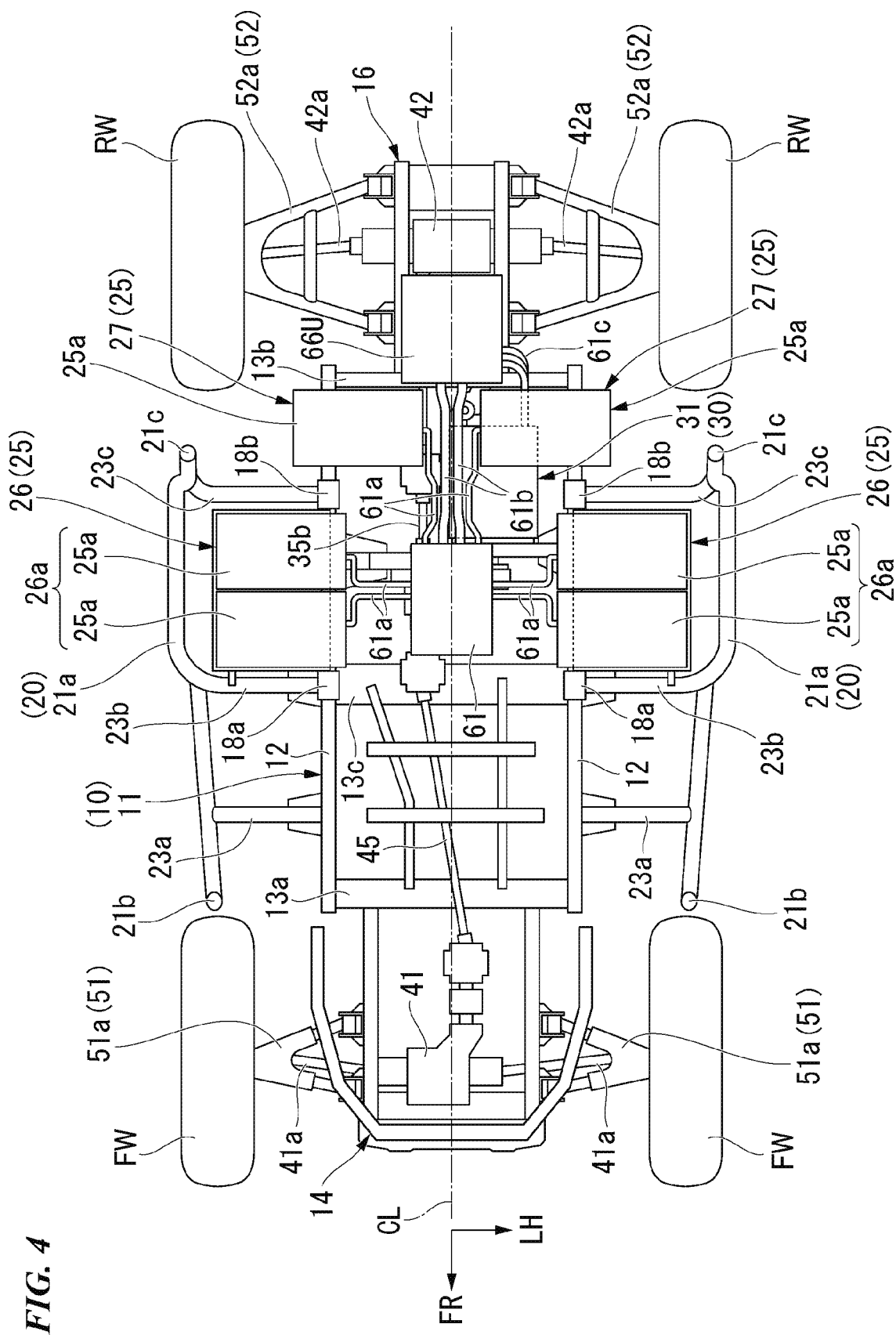
FIG. 4 is a top view showing a power supply system to the drive source of the electric vehicle.

Referring to FIG. 4, the battery 25 includes a first battery 26 disposed below the seat 7, and a second battery 27 disposed behind the first battery 26 (behind and below the seat 7). For example, the first battery 26 and the second battery 27 are configured to include a plurality of unit batteries 25a that are identical to each other. The unit battery 25a has a rectangular parallelepiped shape with the lateral direction as its longitudinal direction. The unit battery 25a is a mobile battery that can be attached to and detached from the vehicle body.

The first battery 26 includes a pair of front and rear unit batteries 25a (hereinafter referred to as the unit battery pair 26a) in each of the left and right side portions of the vehicle body. That is, the first battery 26 includes a total of four unit batteries 25a. The left and right unit battery pairs 26a are disposed below the seat 7. The left and right unit battery pairs 26a are disposed close to each other such that a pair of front and rear unit batteries 25a are in contact with each other. The left and right unit battery pairs 26a are separated from each other in the lateral direction.

The junction box 61 is disposed in a space between the left and right unit battery pairs 26a. The junction box 61 is disposed above at least a portion of the drive device 30 (for example, the distribution mechanism 35). The ECU 66 is disposed behind the junction box 61. The PDU 62 is disposed below the ECU 66. The PDU 62 and the ECU 66 constitute the integrated control unit 66U.

The collective wirings 61b extending from the junction box 61 to the PDU 62, or the like are disposed in the space between the left and right unit battery pairs 26a (the space surrounded by the left and right unit battery pairs 26a and the control unit 66U), in addition to the junction box 61, the unit wirings 61a branching from the junction box 61 to each unit battery 25a.

In plan view, at least a portion of the front and rear propeller shafts 45 and 46 is disposed below the space between the left and right unit battery pairs 26a. That is, the left and right unit battery pairs 26a are disposed separately on the left and right sides to sandwich the front and rear propeller shafts 45 and 46.

The second battery 27 includes a pair of left and right unit batteries 25a. The left and right unit batteries 25a of the second battery 27 are disposed behind and below the seat 7. The left and right unit batteries 25a of the second battery 27 are separated from each other in the lateral direction. A space between the left and right unit batteries 25a of the second battery 27 is narrower than the space between the left and right first batteries 26. For example, in each of the left and right side portions of the vehicle body, a central position of the unit battery 25a of the second battery 27 in the lateral direction and an inner end position of the unit battery 25a of the first battery 26 in the lateral direction are at substantially the same position in the lateral direction. The collective wirings 61b extending in the longitudinal direction from the junction box 61 to the PDU 62 are disposed in the space between the left and right unit batteries 25a of the second battery 27.

The left and right unit batteries 25a of the second battery 27 are disposed to be displaced upward with respect to the left and right unit battery pairs 26a. For example, lower end positions of the left and right unit batteries 25a of the second battery 27 and a central position of the unit battery 25a of the first battery 26 in the vertical direction are at substantially the same position in the vertical direction.

The battery 25 generates a predetermined high voltage (48 to 72 V) by the plurality of unit batteries 25a included in the first battery 26 and the second battery 27 being connected in series. Each unit battery 25a is configured of, for example, a lithium ion battery as a chargeable and dischargeable energy storage. Each unit battery 25a is inserted into and removed from a battery case 28 fixed to the vehicle body from outside in the vehicle width direction. The battery case 28 has a battery insertion and removal port 28a that opens outward in the vehicle width direction, and a lid 28b that opens and closes the battery insertion and removal port 28a. The unit battery 25a is slidably moved in the vehicle width direction from the battery insertion and removal port 28a so that it is removably accommodated in the battery case 28.

The unit wiring 61a corresponding to each unit battery 25a is connected to a wall portion 28c on the inner side of the battery case 28 in the vehicle width direction. The wall portions 28c is provided with a connection terminal 28c1 (a pair of left and right battery connection terminals). The connection terminal 28c1 passes through the wall portion 28c and faces the inside of the case, and detachably connects each unit battery 25a to the unit wiring 61a. The corresponding unit wiring 61a is connected to the connection terminal 28c1. Thus, each unit battery 25a and the corresponding unit wiring 61a are detachably connected to each other via the connection terminal 28c1. One battery case 28 may be provided for each unit battery 25a, or may be provided to accommodate a plurality of unit batteries 25a. Battery cases, which correspond to the left and right unit battery pairs 26a, of the plurality of battery cases 28 may be referred to as left and right battery cases 28d (a pair of left and right battery-holding portions).

Figure 8:
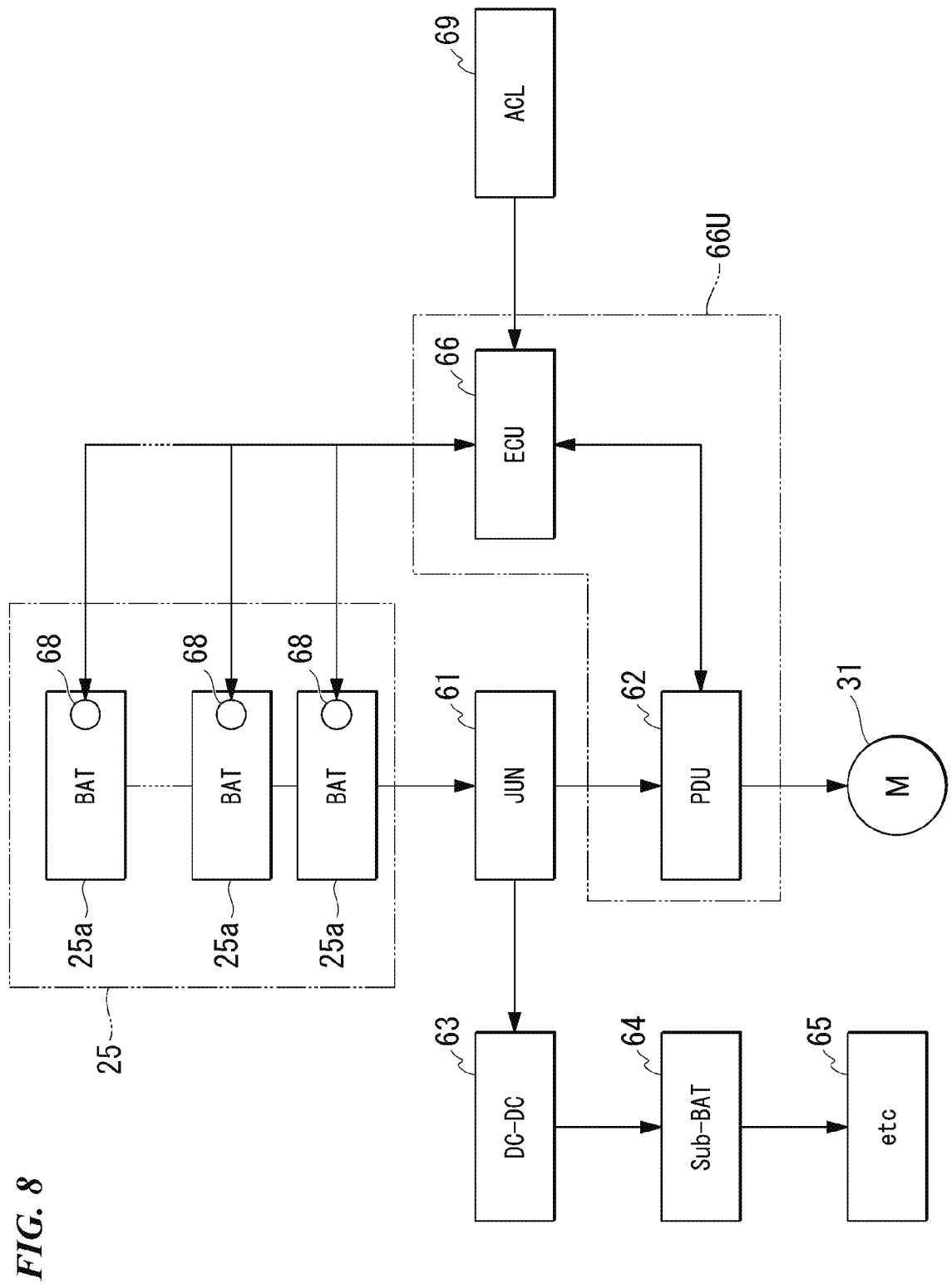
FIG. 8 is a block diagram showing a main configuration of the electric vehicle.

Referring to FIGS. 4 and 8, the power from the battery 25 is supplied to the PDU 62, which is a motor driver, via the junction box 61 having a contactor (not shown) linked with a main switch (not shown). The power from the battery 25 is converted from direct current to three-phase alternating current by the PDU 62 and then supplied to the electric motor 31 that is a three-phase alternating current motor.

An output voltage from the battery 25 is stepped down via a DC-DC converter 63 and supplied to a 12 V sub-battery 64, a general electrical component 65 such as a lighting device, a control system component such as the ECU 66, and the like.

The junction box 61 aggregates a plurality of unit wirings 61a extending from the respective unit batteries 25a and extends the collective wirings 61b toward the PDU 62. The junction box 61 has a fuse corresponding to each unit wiring 61a in addition to the contactor.

The PDU 62 includes an inverter and controls energization of a stator winding of the electric motor 31. The PDU 62 is provided with a heat sink.

For example, the unit battery 25a is charged by a charger connected to an AC 100 V power source in a state of being removed from the vehicle body. Also, the electric vehicle 1 may be configured to have a charger. The unit battery 25a includes a battery-managing unit (BMU) 68 that monitors charge and discharge status, temperature, and the like. Information monitored by the BMU 68 is shared with the ECU 66 when the battery is mounted on the vehicle body. Output request information from an accelerator sensor 69 is input to the ECU 66. The ECU 66 controls driving of the electric motor 31 via the PDU 62 on the basis of the output request information which has been input.

The plurality of unit wirings 61a extending from the respective battery cases 28 are connected to the junction box 61 between the unit battery pairs 26a. The collective wirings 61b extend rearward from a rear portion of the junction box 61, and the collective wirings 61b are connected to the PDU 62. A three-phase cable 61c (a third wiring) extends forward from the PDU 62. The three-phase cable 61c is routed to the left and connected to the electric motor 31. The electric motor 31 performs a power running operation in accordance with the control from the PDU 62 and causes the electric vehicle 1 to travel.

As described above, the electric vehicle 1 in the above embodiment includes the seat 7 on which an occupant sits, the pair of left and right unit battery pairs 26a of the battery 25 which are disposed separately on the left and right sides below the seat 7, and the pair of left and right battery cases 28d which are provided in the vehicle body and detachably hold the left and right unit battery pairs 26a, respectively.

According to the above configuration, since the unit battery pairs 26a are disposed separately on the left and right sides in a dead space below the seat 7, capacity of the battery 25 can be easily secured, and traveling stability, particularly in a rolling direction of the vehicle, can be improved due to a distributed arrangement of the unit battery pairs 26a, which are heavy objects, in the lateral direction. Moreover, heat radiation of the battery 25 can be dispersed due to the distributed arrangement of the unit battery pairs 26a and thus heat source concentration of the battery 25 can be avoided. Further, the unit battery pairs 26a can be easily attached and detached from an outer side in the vehicle width direction, and thus the battery 25 can be easily made mobile.

Also, in the electric vehicle 1, the left and right unit battery pairs 26a are detachable from the left and right battery cases 28d by sliding them in the lateral direction.

According to the above configuration, as compared to the configuration in which the left and right unit battery pairs 26a are detachable by moving them in the vertical direction, the battery cases 28 can easily receive a weight of the battery when the battery is attached and detached, and thus the attachment and detachment work of the battery 25, which is a heavy object, can be facilitated.

Also, in the electric vehicle 1 described above, the propeller shafts 45 and 46 extending in the longitudinal direction on the inner side in the vehicle width direction are provided, and the left and right unit battery pairs 26a are disposed to sandwich the propeller shafts 45 and 46 in the lateral direction.

According to the above configuration, since the left and right unit battery pairs 26a are disposed separately on the left and right sides of the propeller shafts 45 and 46 on the inner side in the vehicle width direction, an efficient layout of the left and right unit battery pairs 26a, particularly in a four-wheel drive vehicle, can be realized.

Also, in the electric vehicle 1 described above, the step floor 5 on which the occupant places his or her foot and the step frame 5a which supports the step floor 5 are provided, the step frame 5a has the lower side portions 21a disposed outward in the vehicle width direction from the left and right unit battery pairs 26a, and the rear upward extension portions 21c disposed behind the left and right unit battery pairs 26a are connected to rear sides of the lower side portions 21a.

According to the above configuration, since the left and right unit battery pairs 26a are disposed on the inner side in the vehicle width direction of the outer arrangement portions (lower side portions 21a) of the step frame 5a and are disposed in front of the rear arrangement portions (rear upward extension portions 21c), external disturbances from outside in the vehicle width direction and from the rear to the left and right unit battery pairs 26a can be prevented by using the frame members including the step frame 5a.

Also, in the electric vehicle 1 described above, the electric motor 31 connected to the drive wheels (front and rear wheels FW and RW) and the second battery 27 disposed behind the seat 7 are provided, and at least a portion of the electric motor 31 is disposed between the seat 7 and the second battery 27.

According to the above configuration, since the electric motor 31 is disposed adjacent to the left and right unit battery pairs 26a and the second battery 27 and is disposed to be surrounded by the plurality of unit batteries 25a, an efficient layout in which distances between the plurality of unit batteries 25a and the electric motor 31 are reduced can be achieved, and thus mass concentration can be achieved.

Also, in the electric vehicle 1 described above, the electric motor 31 is configured such that at least a portion of the electric motor 31 is disposed below the seat 7 and overlaps the left and right unit battery pairs 26a in its position in the longitudinal direction.

According to the above configuration, since at least a portion of the electric motor 31 is disposed in the dead space below the seat 7, and the electric motor 31 overlaps the unit battery pairs 26a below the seat 7 in its position in the longitudinal direction, even in a small electric vehicle 1, the space below the seat 7 can be effectively used, and thus the bulky electric motor 31 can be disposed therein and mass concentration can be achieved. In addition, since the unit battery pairs 26a and the electric motor 31 which are heavy objects are disposed below the seat 7 disposed in the central portion of the vehicle in the longitudinal direction, further mass concentration can be achieved.

Also, in the electric vehicle 1 described above, at least a portion (the lower portion) of the electric motor 31 is disposed to overlap the side frame 12 of the vehicle body frame 10 in side view and to overlap the cross frames 13a, 13b, and 13c of the vehicle body frame 10 in front view.

According to the above configuration, since the electric motor 31 and the vehicle body frame members are disposed to overlap in the side view and the front view, external disturbances to the electric motor 31 in the longitudinal direction and the vehicle width direction can be prevented utilizing the vehicle body frame members.

Also, in the electric vehicle 1 described above, the distribution mechanism 35 coupled to the electric motor 31 is provided, and at least a portion of the distribution mechanism 35 is disposed below the seat 7.

According to the above configuration, since at least a portion of the distribution mechanism 35 coupled to the electric motor 31 is disposed below the seat 7, the dead space below the seat 7 can be used more effectively. In addition, since the seat 7 is disposed at the central portion of the vehicle in the longitudinal direction, the distribution mechanism 35, which is a heavy object, is disposed at the central portion of the vehicle in the longitudinal direction, and thus further mass concentration can be achieved.

Also, in the electric vehicle 1 described above, the propeller shafts 45 and 46 extending in the longitudinal direction of the vehicle from the distribution mechanism 35 are provided, and the electric motor 31 is disposed with the output shaft 31a directed in the longitudinal direction of the vehicle.

According to the above configuration, since the output shaft 31a of the electric motor 31 and the propeller shafts 45 and 46 are disposed substantially parallel to each other, it becomes easy to connect the electric motor 31 and the propeller shafts 45 and 46 via the distribution mechanism 35, and thus driving power can be transmitted efficiently by shortening a transmission path. In addition, by disposing the output shaft 31a of the electric motor 31 and the propeller shafts 45 and 46 in the longitudinal direction, bulkiness in the vehicle width direction can be curbed and thus a compact arrangement can be achieved.

Also, in the electric vehicle 1 described above, the propeller shafts 45 and 46 and the output shaft 31a of the electric motor 31 are disposed to sandwich the center line CL in the vehicle width direction in plan view.

According to the above configuration, since the propeller shafts 45 and 46 and the output shaft 31a of the electric motor 31 are laid out across the center line CL in the vehicle width direction, the traveling stability can be increased due to the distributed arrangement of the electric motor 31 and the propeller shafts 45 and 46 that are heavy objects. Also, the distribution mechanism 35 that connects the electric motor 31 and the propeller shafts 45 and 46 straddles the center line CL in the vehicle width direction, so that mass concentration can be achieved.

Also, in the electric vehicle 1 described above, the first rubber mount portion 33M is provided between the electric motor 31 and the vehicle body frame 10, and the second rubber mount portions 37M and 38M are provided between the distribution mechanism 35 and the vehicle body frame 10.

According to the above configuration, since the electric motor 31 and the distribution mechanism 35 are supported on the vehicle body frame 10 using the plurality of rubber mount portions 33M, 37M, and 38M, vibration-proof properties of the drive device 30 can be improved.

Also, in the electric vehicle 1 described above, the pair of left and right battery connection terminals 28c1 which are provided on the inner sides of the left and right battery cases 28d in the vehicle width direction and connected respectively to the left and right unit battery pairs 26a are provided.

According to the above configuration, since the battery connection terminals 28c1 which connect the left and right unit battery pairs 26a to each other are disposed to be directed inward in the vehicle width direction from the left and right battery cases 28d, it is difficult for external disturbances from outside in the vehicle width direction to affect the battery connection terminals 28c1, and thus the battery connection terminals 28c1 can be satisfactorily protected.

Also, in the electric vehicle 1 described above, the pair of left and right unit wirings 61a corresponding to the left and right unit battery pairs 26a are provided between the left and right battery cases 28d, the right unit wiring 61a is connected to the right battery connection terminal 28c1 from a side inward in the vehicle width direction from the right battery case 28d, and the left unit wiring 61a is connected to the left battery connection terminal 28c1 from a side inward in the vehicle width direction from the left battery case 28d.

According to the above configuration, since the unit wirings 61a that reach the battery connection terminals 28c1 are disposed on the inner sides of the left and right battery cases 28d in the vehicle width direction, high-voltage wiring can be satisfactorily protected.

Also, in the electric vehicle 1 described above, the junction box 61 which distributes the unit wirings 61a toward the left and right battery connection terminals 28c1 is provided, and the junction box 61 is disposed between the left and right battery cases 28d.

According to the above configuration, since the junction box 61 is disposed between the left and right battery cases 28d, optimization of the wiring can be achieved, for example, by shortening the unit wirings 61a extending from the junction box 61 to the left and right battery connection terminals 28c1.

Also, in the electric vehicle 1 described above, the control unit 66U which controls charging and discharging between the electric motor 31 and the left and right unit battery pairs 26a is provided, the control unit 66U is disposed behind the junction box 61, and the collective wirings 61b extending between the junction box 61 and the control unit 66U, the three-phase cable 61c extending between the control unit 66U and the electric motor 31, and the left and right unit wirings 61a are disposed in a region surrounded by the left and right battery cases 28d, the junction box 61, and the control unit 66U.

According to the above configuration, since high-voltage electrical wirings are disposed in a space surrounded by the left and right battery cases 28d, the junction box 61 and the control unit 66U, the electrical wirings are concentrated on the inner side in the vehicle width direction, so that it is difficult for external disturbances to affect them, and thus the high-voltage wirings can be satisfactorily protected.

Also, the present invention is not limited to the above embodiment, and, for example, the electric vehicle may be not only a four-wheeled vehicle but also a three-wheeled vehicle (including a vehicle with two front wheels and one rear wheel in addition to a vehicle with one front wheel and two rear wheels).

In addition, it should be understood that the configuration in the embodiment is an example of the present invention, and various modifications can be made without departing from the gist of the present invention, such as replacing the constituent elements of the embodiment with known constituent elements.

DESCRIPTION OF THE REFERENCE SYMBOLS

1 Electric vehicle
5 Step floor
5a Step frame
7 Seat
10 Vehicle body frame
12 Side frame (vehicle body frame member)
13a Front cross frame (vehicle body frame member)
13b Rear cross frame (vehicle body frame member)
13c Intermediate cross frame (vehicle body frame member)
21a Lower side portion (outer arrangement portion)
21c Rear upward extension portion (rear arrangement portion)
25 Battery
25a Unit battery
26 First battery
26a Unit battery pair (battery)
27 Second battery
28 Battery case
28c1 Battery connection terminal
28d Battery case (battery-holding portion)
31 Electric motor
31a Output shaft
33M, 37M, 38M Rubber mount portion
35 Distribution mechanism (transmission mechanism)
45 Front propeller shaft
46 Rear propeller shaft
61 Junction box (distribution box)
61a Unit wiring (battery wiring)
61b Collective wiring (second wiring)
61c Three-phase cable (third wiring)
66U Control unit (control portion)
FW Front wheel (drive wheel)
RW Rear wheel (drive wheel)
CL Lateral center of vehicle body (center line)

What is claimed is:

1. An electric vehicle, comprising:
a pair of left and right batteries;
a pair of left and right battery-holding portions which respectively hold the left and right batteries;
a pair of left and right battery connection terminals which are provided on inner sides of the left and right battery-holding portions in a vehicle width direction and connected respectively to the left and right batteries;
an electric motor connected to a drive wheel; and
a control unit which controls charging and discharging between the electric motor and the left and right batteries,
wherein a pair of left and right battery wirings which correspond respectively to the left and right batteries are provided between the left and right battery-holding portions,
the right battery wiring is connected to the right battery connection terminal from a side inward in the vehicle width direction from the right battery-holding portion,
the left battery wiring is connected to the left battery connection terminal from a side inward in the vehicle width direction from the left battery-holding portion,
the electric vehicle comprises a distribution box which distributes the battery wirings toward the left and right battery connection terminals,
the distribution box is disposed between the left and right battery-holding portions,
the control unit is disposed behind the distribution box, and
a second wiring extending between the distribution box and the control unit, a third wiring extending between the control unit and the electric motor, and the left and right battery wirings are disposed in a region surrounded by the left and right battery-holding portions, the distribution box, and the control unit.

* * * * *